Jan. 2, 1934.   C. B. LOWE   1,942,176
LOCK
Filed March 19, 1930
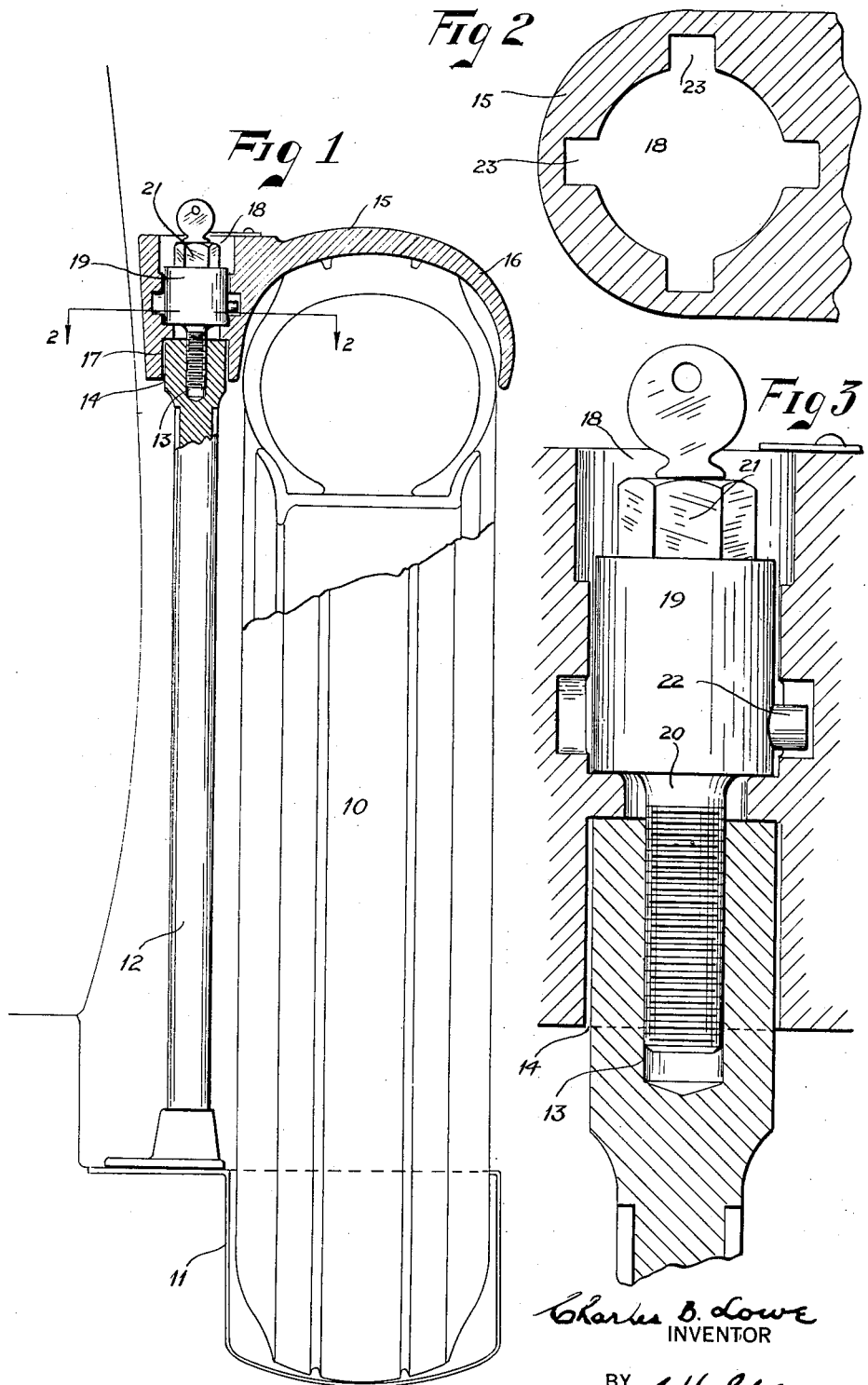
Charles B. Lowe
INVENTOR
BY A. H. Golden
ATTORNEY

UNITED STATES PATENT OFFICE 1,942,176

LOCK

Charles B. Lowe, Philadelphia, Pa., assignor to The Yale & Towne Manufacturing Company, Stamford, Conn.

Application March 19, 1930. Serial No. 437,051

2 Claims. (Cl. 70—90)

This invention relates to locks of the type adapted to secure a spare wheel or tire to an automobile, to prevent unauthorized removal of the same.

For one embodiment of my invention, I refer to the drawing wherein Fig. 1 is a partial section of my locking device as applied to an automobile spare wheel. Fig. 2 is a section along line 2—2 of Fig. 1. Fig. 3 is an enlarged view of part of Fig. 1.

Referring now more particularly to the drawing, reference numeral 10 indicates a spare tire or wheel which is adapted to rest in a usual fender well 11 of an automobile. A standard 12 is secured to the frame of the car, and this standard is equipped with a square-head 14 having a screw threaded bore 13.

A tire locking or securing element 15 has a curved portion 16 for cooperation with the tire, and has a squared recess 17 for the retention of the squared head 14 of the standard 12. This locking element 15 is also equipped with an opening 18 for the accommodation of a locking bolt 19, this locking bolt 19 being equipped with a threaded portion 20 which cooperates with the screw-threads of the bore 13. The bolt 19 is also equipped with a hexagon head 21 by means of which it may be rotated relatively to the threaded head 14 of the standard 12 so as to secure the locking unit 15 firmly to that standard.

The locking bolt 19 is also equipped with a usual type of key operated sliding tumbler or pin tumbler cylinder having a locking bolt 22 which is adapted to cooperate with a series of notches 23, in the locking unit 15.

It will readily be understood that once the bolt 19 has been rotated to secure the elements 15 and 12 relatively to one another, the key controlled bolt 22 may be allowed to enter one of the notches 23 and thereby lock the bolt 19 against movement relatively to the locking element 15. Since this locking element 15 is held against rotary movement relatively to the standard 12 by means of the square-head 14 lying in the squared recess 17, it will be obvious that it is impossible to rotate the bolt 19 relatively to the standard to release the locking element 15 from tire locking position.

While I have shown the standard 12 as equipped with a screw-threaded bore, and the locking element 15 as carrying the bolt 19, it should be understood that the standard 12 may be equipped with an upstanding bolt and the element 15 may carry a screw-threaded nut which may be locked in bolt engaging position similarly to the present bolt 19. Similarly, the standard 12 may be in any other desired position or may be simply a support or securing element relatively to which other devices may be secured, since my invention is not limited merely for use as a tire lock. While I have shown one embodiment of my invention, it should be understood that modifications of the same within the scope of the appended claims will readily occur to one skilled in the art.

I claim:

1. In a locking device of the class described, a fixed standard, a tire securing element adapted to be secured relatively to said standard, and a socket on said tire securing member cooperative with complementary end of said standard for maintaining said tire securing element against rotary movement relatively to said standard, a screw threaded bore in said standard, a screw threaded bolt positioned in said securing element and adapted to be screwed into said bore to secure said tire securing element relatively to said standard, and key controlled means carried as an integral portion of said bolt and adapted to lock said bolt positively against substantial rotary movement relatively to said element.

2. In a locking device of the class described, a fixed vertical standard, a tire engaging and locking element having a socket constructed so as to fit in non-rotating relation on the end of said standard whereby said element is held against rotary movement relatively to said standard, threaded means on the end of said standard, cooperative threaded means on said locking element and cooperable with said first threaded means to secure said element in tire engaging position relatively to said standard, when said cooperative threaded means are rotated in one direction, and a key controlled locking mechanism carried by and forming an integrally movable portion of said cooperative threaded means and adapted to lock the same positively against reverse rotation relatively to said tire locking element, and thus relatively to said standard.

CHARLES B. LOWE.